United States Patent [19]

Montgomery

[11] E Re. 30,203

[45] Reissued Feb. 5, 1980

[54] FUEL CONTROL CROSS SHAFT

[75] Inventor: Alvin W. Montgomery, Washington, Ill.

[73] Assignee: Caterpillar Tractor Co., Peoria, Ill.

[21] Appl. No.: 955,084

[22] Filed: Oct. 26, 1978

Related U.S. Patent Documents

Reissue of:

[64] Patent No.: 4,091,785
Issued: May 30, 1978
Appl. No.: 706,715
Filed: Jul. 19, 1976

[51] Int. Cl.[2] ..... F02D 1/04
[52] U.S. Cl. ..... 123/140 R
[58] Field of Search ..... 123/139 R, 139 AK, 140 R; 417/286

[56] References Cited

U.S. PATENT DOCUMENTS

| | | | |
|---|---|---|---|
| 3,903,852 | 9/1975 | Sola | 123/140 MC X |
| 3,934,568 | 1/1976 | Malyshev et al. | 123/140 R |

FOREIGN PATENT DOCUMENTS

| | | | |
|---|---|---|---|
| 857490 | 9/1940 | France | 123/140 R |
| 391379 | 8/1965 | Switzerland . | |

OTHER PUBLICATIONS

"Moteurs PA6-V280 Precis de Poche," Published by S.E.M.T. Pielstick, Dec. 1974.

*Primary Examiner*—Tony Argenbright
*Attorney, Agent, or Firm*—Ralph E. Walters

[57] ABSTRACT

The invention is concerned with an improved fuel injection control system which is useful with an internal combustion engine comprising a pair of pluralities of equal numbers of cylinders with said pairs of pluralities of cylinders being aligned side by side and including a pair of pluralities of fuel injection pumps in one-to-one relation with said cylinders. The improved system serves to control each of the pumps to operate simultaneously and to deliver a generally equal amount of fuel to each respective cylinder. The improved control system comprises a pair of control shafts, one aligned parallel to each of the pairs of pluralities of cylinders and generally perpendicular to the axis of each of said cylinders and spaced laterally therefrom. The system further includes a pair of pluralities of fuel injector pump control link means, each of said pairs of pluralities of pump control link means being movable responsive to rotation of a respective one of said control shafts, each of said pump control link means controlling fuel injection from a respective one of said pumps to a respective corresponding cylinder. Also part of the control system is a cross shaft extending from adjacent a respective one of said control shafts to adjacent a respective other thereof, and mounted to rotate about a longitudinal axis thereof. Still further a part of the system is means for controlling rotation of the cross shaft about the longitudinal axis thereof and means communicating the cross shaft with each of the control shafts to cause an equal rotation of each of the control shafts about a longitudinal axis thereof responsive to a rotation of the cross shaft about the longitudinal axis thereof.

6 Claims, 4 Drawing Figures

FUEL CONTROL CROSS SHAFT

Matter enclosed in heavy brackets [ ] appears in the original patent but forms no part of this reissue specification; matter printed in italics indicates the additions made by reissue.

BACKGROUND OF THE INVENTION

1. Field of the Invention

The invention is concerned with fuel injection engines and more particularly with multicylinder engines which include two parallel lines of cylinders and fuel injection pumps which inject fuel into each of these cylinders, for example, a V-8, V-12 or V-16 engine or the like wherein each of the cylinders is supplied with fuel from a respective fuel injection pump. More particularly, the invention is concerned with a unique mechanical arrangement which ensures that each of the fuel injection pumps operates simultaneously and deliver a generally equal quantity of fuel to each of the respective cylinders on each side of the engine.

2. Prior Art

Engines with two pairs of pluralities of aligned cylinders are, of course, well known to the art. Such engines have often been used with fuel injector pumps wherein either a separate fuel injector pump is used for each cylinder or where a separate fuel injector pump is at least used for each line of cylinders. Many rather complicated mechanical arrangements have been tried to provide substantially simultaneous operation of such fuel pumps and to provide that such fuel pumps provide a generally equal amount of fuel to each respective cylinder. The prior art, however, has not succeeded in providing a relatively direct-acting, easy to maintain system which, without the use of complicated linkages, successfully controls each of the plurality of fuel injection pumps to operate simultaneously and to deliver a generally equal amount of fuel to each respective cylinder. The present invention, on the other hand, provides just such a system.

SUMMARY OF THE INVENTION

The invention is concerned with an improved system useful in an internal combustion engine comprising a pair of pluralities of equal numbers of cylinders with said pairs of pluralities of pairs of cylinders being aligned side by side and including a pair of pluralities of fuel injection pumps. The improved system of the present invention serves to control each of the pumps to operate simultaneously and to deliver a generally equal amount of fuel to each respective cylinder. The improved system comprises a pair of control shafts, one aligned parallel to each of the pairs of pluralities of cylinders and generally perpendicular to the axis of each of the cylinders and spaced laterally therefrom. The system further includes a pair of pluralities of fuel injector pump control link means, each of said pairs of pluralities of pump control link means being movable responsive to rotation of a respective one of the control shafts, each of the fuel injector pump control link means controlling fuel injection from a respective one of said pumps to a respective corresponding cylinder. Still further a part of the system is a cross shaft extending from adjacent a respective one of the control shafts to adjacent a respective other thereof, and mounted to rotate about a longitudinal axis thereof. Yet further a part of the control system of the present invention are means for controlling rotation of the cross shaft about the longitudinal axis thereof, and means communicating the cross shaft with each of the control shafts to cause an equal rotation of each of the control shafts about a longitudinal axis thereof responsive to a rotation of the cross shaft about the longitudinal axis thereof.

BRIEF DESCRIPTION OF THE DRAWINGS

The invention will be better understood by reference to the figures of the drawings wherein like numbers denote like parts throughout, and wherein.

DETAILED DESCRIPTION OF THE PREFERRED EMBODIMENT

Figure 1:
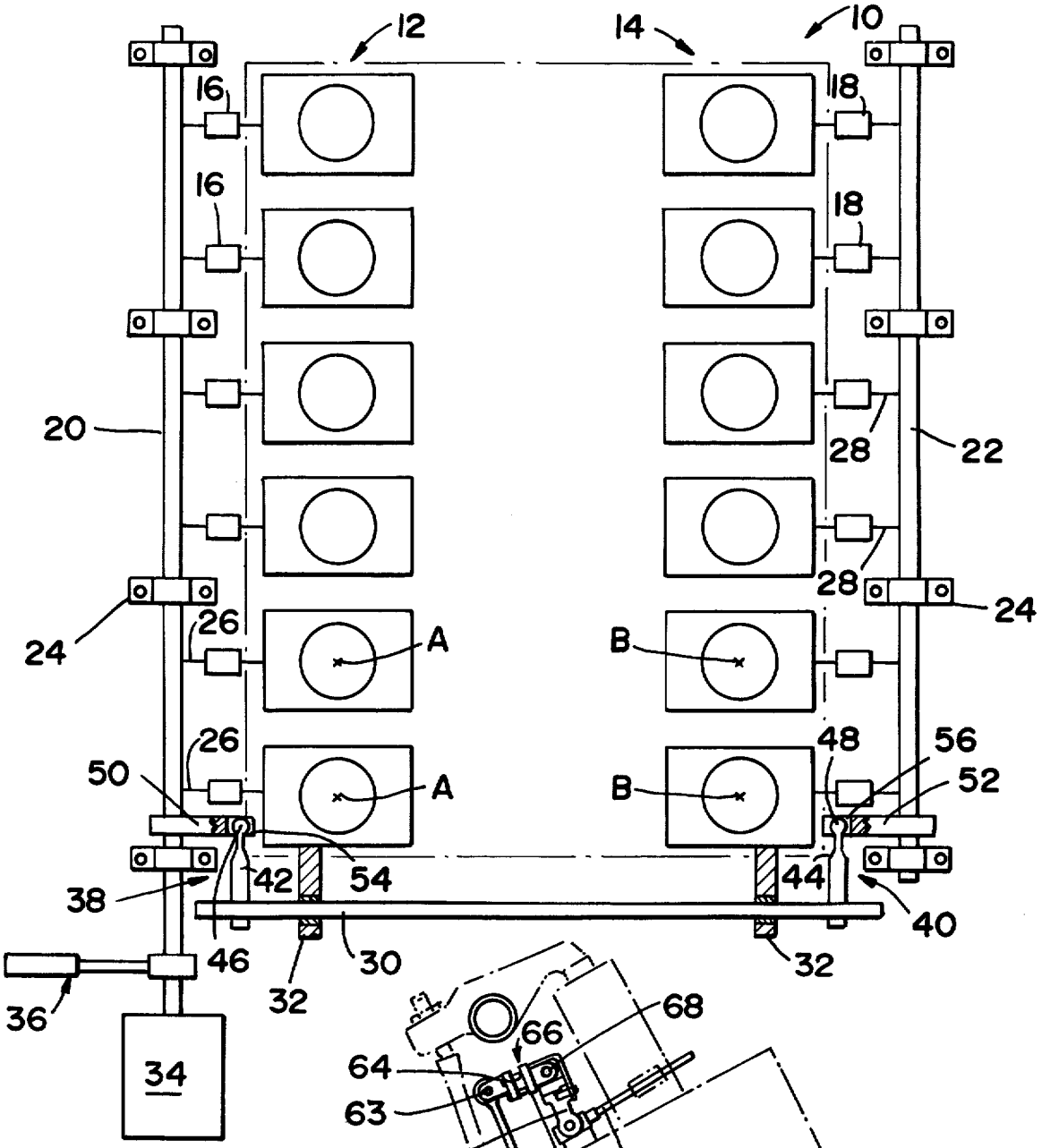
FIG. 1 illustrates schematically the improved control system of the present invention in its use environment.

Referring to FIG. 1, there is shown therein a V-12 engine 10 having a first plurality of aligned cylinders 12 and a second plurality of aligned cylinders 14. The two pluralities of aligned cylinders 12, 14 are aligned parallel to one another in the usual V configuration. A pair of pluralities of fuel injection pumps 16, 18, respectively, for the first and second pluralities of cylinders 12, 14, respectively, each provide injection of fuel into one of the cylinders. Generally, it will be desirable to have a plurality of fuel injection pump 16 in one-to-one relation with the cylinders 12, and a plurality of fuel injection pump 18 in one-to-one relation with the second plurality of cylinders 14.

A first control shaft 20 is aligned parallel to the first plurality of aligned cylinders 12, and a second control shaft 22 is similarly aligned parallel to the second plurality of aligned cylinders 14 and parallel to the first control shaft 20. The control shaft 20 is generally perpendicular to and spaced laterally from the axes A of the cylinders 12. The second control shaft 22 is generally spaced from and generally perpendicular to the axes B of the cylinders 14. Conventional mounting means 24 serve to hold the control shafts 20, 22 in position and to allow rotation thereof.

Each of the fuel injection pumps 16 and 18 has a pump control link means 26, 28, respectively, for the first fuel injection pumps 16 and the second fuel injection pumps 18. The link means 26, 28 are movable responsive to rotation of a respective one of the control shafts 20, 22. Each of the link means 26, 28 controls fuel injection from a respective one of the pumps 16, 18 to a respective corresponding cylinder 12, 14, respectively.

A cross shaft 30 is essential to the practice of the present invention, so as to provide coordinate movement of the pump control link means 26, 28. The cross shaft 30 extends from adjacent a respective one of the control shafts, e.g. the first control shaft 20 to adjacent a respective other thereof, e.g. the second control shaft 22. The cross shaft 30 is mounted by a plurality of brackets 32 to rotate about a longitudinal axis thereof. Means are provided for controlling the rotation of the cross shaft about the longitudinal axis thereof. In the embodiment illustrated, these means comprise an electronic governor control 34 which serves to rotatingly drive the cross shaft 30. Generally, a manually-operated control, such as a hand lever 36, is provided to override the electronic governor control 34 and provide a safety shut-off of the fuel injection pumps 16, 18, and hence of the engine 10.

Figure 4:
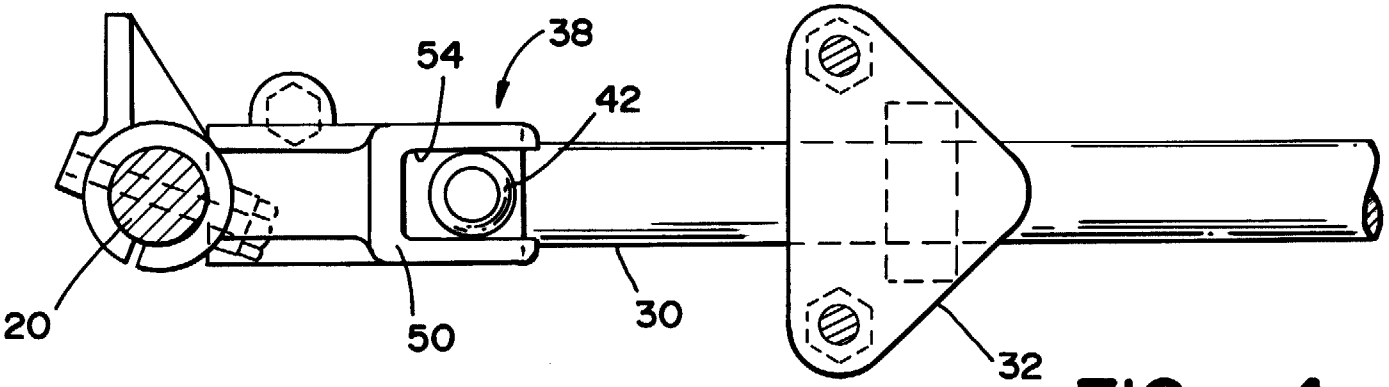
FIG. 4 illustrates a view taken from the line IV—IV of FIG. 3.
Figure 3:
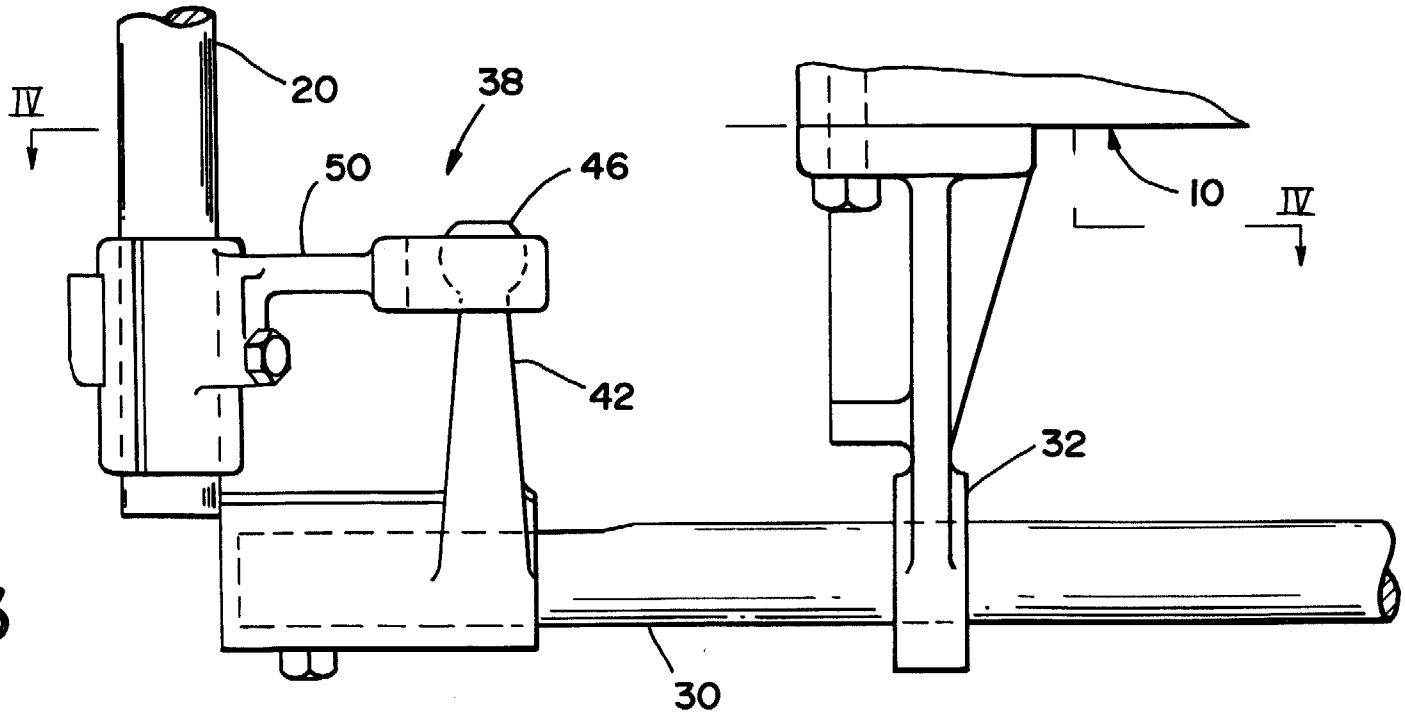
FIG. 3 illustrates in blown-up view a detail in the structure of the embodiment illustrated in FIG. 1.

Shaft interlocking means 38, 40 are generally provided for interlocking rotation of the cross shaft 30 with rotation of the first control shaft 20 and the second control shaft 22, respectively. This is illustrated most clearly in FIGS. 3 and 4. The shaft interlocking means 38, 40 thus provide means communicating the cross shaft 30 with each of the control shafts 20, 22 to cause an equal rotation of each of the control shafts 20, 22 about a longitudinal axis thereof responsive to a rotation of the cross shaft 30 about the longitudinal axis thereof. The shaft interlocking means 38, 40 each comprise in the preferred embodiment of the invention a pair of control levers 42, 44, respectively, one mounted adjacent each end of the cross shaft 30 and extending generally latitudinally therefrom, each of the control levers 42, 44 including a generally rounded section 46, 48, respectively, said generally rounded section being generally spherical in shape and usually being adjacent an end of the respective control lever 42, 44 furthest removed from the cross shaft 30. The control shafts 20, 22, respectively, generally include a follower lever 50, 52, respectively, one follower lever extending generally latitudinally from each of the control shafts 20, 22, respectively. Each of the follower levers 50, 52 generally includes a slotted section, in the embodiment illustrated the slotted sections 54, 56, respectively. The rounded sections 46, 48, respectively, of the control levers 42, 44, respectively, fit within the slotted sections 54, 56, respectively, of the follower levers 50, 52, respectively, in bearing relationship to cause rotation of the follower levers 50, 52, respectively, to be generally simultaneous and generally equal.

Figure 2:
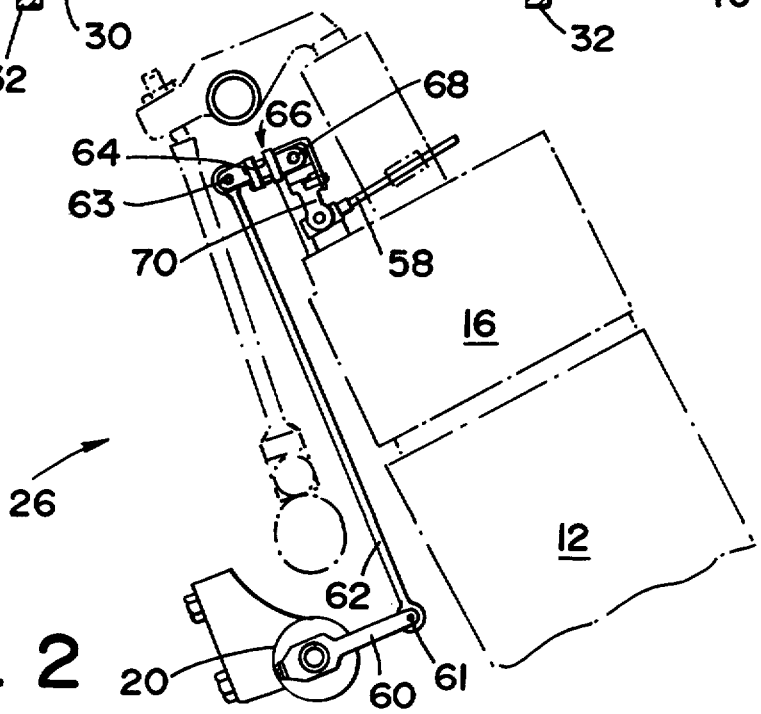
FIG. 2 illustrates, partially in section, the operation of a fuel injector pump as controlled by the control system of the present invention.

Turning now to FIG. 2, it will be seen that movement of the pump control link means 26 (or 28) which is caused by rotation of the shaft 20 (or 22) lead to movement of a valve control rack 58, and thereby leads to injection of fuel into a respective one of the cylinders 12 (or 14) from a respective one of the fuel injection pumps 16 (or 18). Any of a number of relatively simple link means 26 can be used to accomplish this. In the particular embodiment illustrated, rotation of the control shaft 20 in a counterclockwise direction leads to rotation of the control lever 60 in the same direction, in turn acting via a pivot 61 causing a rod 62 to move generally upwardly and act via a pivot 63 against a first arm 64 of a crank structure 66, thereby causing said crank structure 66 to rotate in a clockwise direction about a central pivot 68. This causes a second arm 70 of the crank structure 66 to pull outwardly on the rack 58, which controls the fuel injection pump 16.

While the invention has been described in connection with specific embodiments thereof, it will be understood that it is capable of further modification, and this application is intended to cover any variations, uses or adaptations of the invention following, in general, the principles of the invention and including such departures from the present disclosures as come within known or customary practice in the art to which the invention pertains and as may be applied to the essential features hereinbefore set forth, and as fall within the scope of the invention and the limits of the appended claims.

I claim:

1. In an internal combustion engine comprising a pair of pluralities of equal numbers of cylinders with said pairs of pluralities of cylinders being aligned side by side, and including a fuel injector pump for each of said cylinders, an improved system for controlling each of said pumps to operate simultaneously and to deliver a generally equal amount of fuel to each respective cylinder, comprising:

a pair of control shafts, one aligned parallel to each of said pairs of pluralities of cylinders generally perpendicular to the axes of each of said cylinders and spaced laterally therefrom;

a pair of pluralities of fuel injector pump control link means, each of said pairs of pluralities of link means being movable responsive to rotation of a respective one of said control shafts, each of said link means controlling fuel injection from a respective one of said pumps to a respective corresponding cylinder;

a cross shaft extending from adjacent a respective *end of* one of said control shafts to adjacent a respective *end of the* other *of said control shafts* thereof *in coplanar relation therewith*, and mounted to rotate about a longitudinal axis thereof;

means for controlling rotation of said cross shaft about a longitudinal axis thereof; and means communicating said cross shaft with *the ends of* each of said control shafts to cause an equal rotation of each of said control shafts about a longitudinal axis thereof responsive to a rotation of said cross shaft and about a longitudinal axis thereof.

2. An improved control system as in claim 1, wherein said cross shaft—control shaft communicating means comprises a pair of control levers, one mounted adjacent each end of said cross shaft and extending generally latitudinally therefrom, each of said control levers including a generally rounded section spaced from said cross shaft and wherein said system includes a pair of follower levers, one extending generally latitudinally from each of said control shafts, each of said follower levers including a slotted section spaced from a respective one of said control shafts, said rounded sections of said control levers each fitting within a respective slotted section of a respective one of said follower levers, rotation of said cross shaft causing simultaneous rotation of said control levers which each bear against a respective one of said follower levers causing rotation thereof which in turn causes a simultaneous and generally equal rotation of each respective one of said control shafts.

3. An improved control system as in claim 2, wherein said engine comprises a V engine.

4. An improved control system as in claim 3, including an electronic governor controlling rotation of said cross shaft.

5. An improved control system as in claim 4, including an operator-shiftable manual control for overriding said electronic governor to provide a capability for safety shut-off of fuel from said fuel injector pumps.

6. An improved control system as in claim 5, wherein said fuel injector pump control link means comprise racks.

* * * * *